3,520,671
PROCESS AND EQUIPMENT FOR MANUFACTURE OF GLASS ARTICLES WITH AUTOMATIC MACHINES BY SUCTION AND PRESSING
Giuseppe Lemetre, Via Lamarmora 25, Florence, Italy
Filed July 27, 1965, Ser. No. 475,095
Claims priority, application Italy, Dec. 14, 1964, 26,733/64
Int. Cl. C03b 11/04
U.S. Cl. 65—76  6 Claims

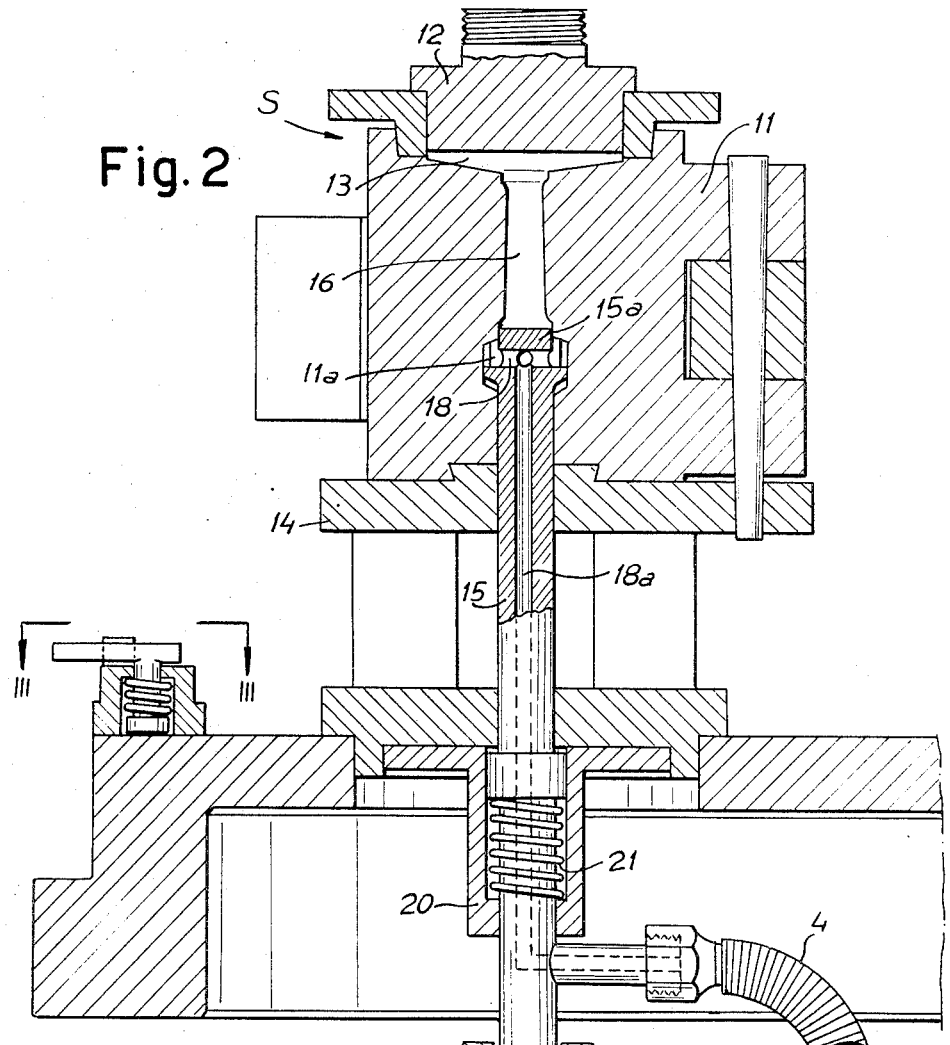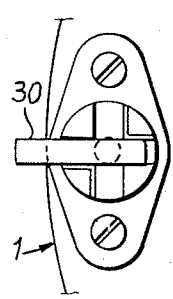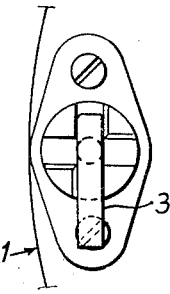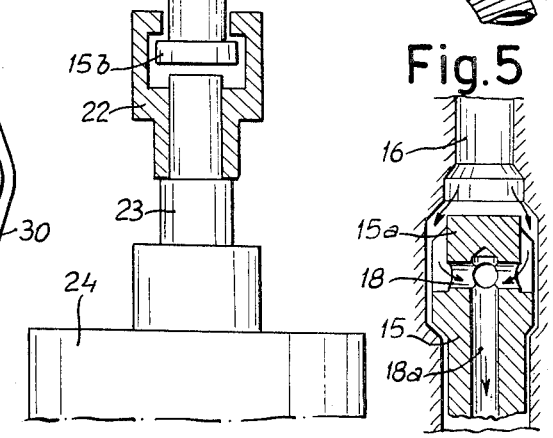

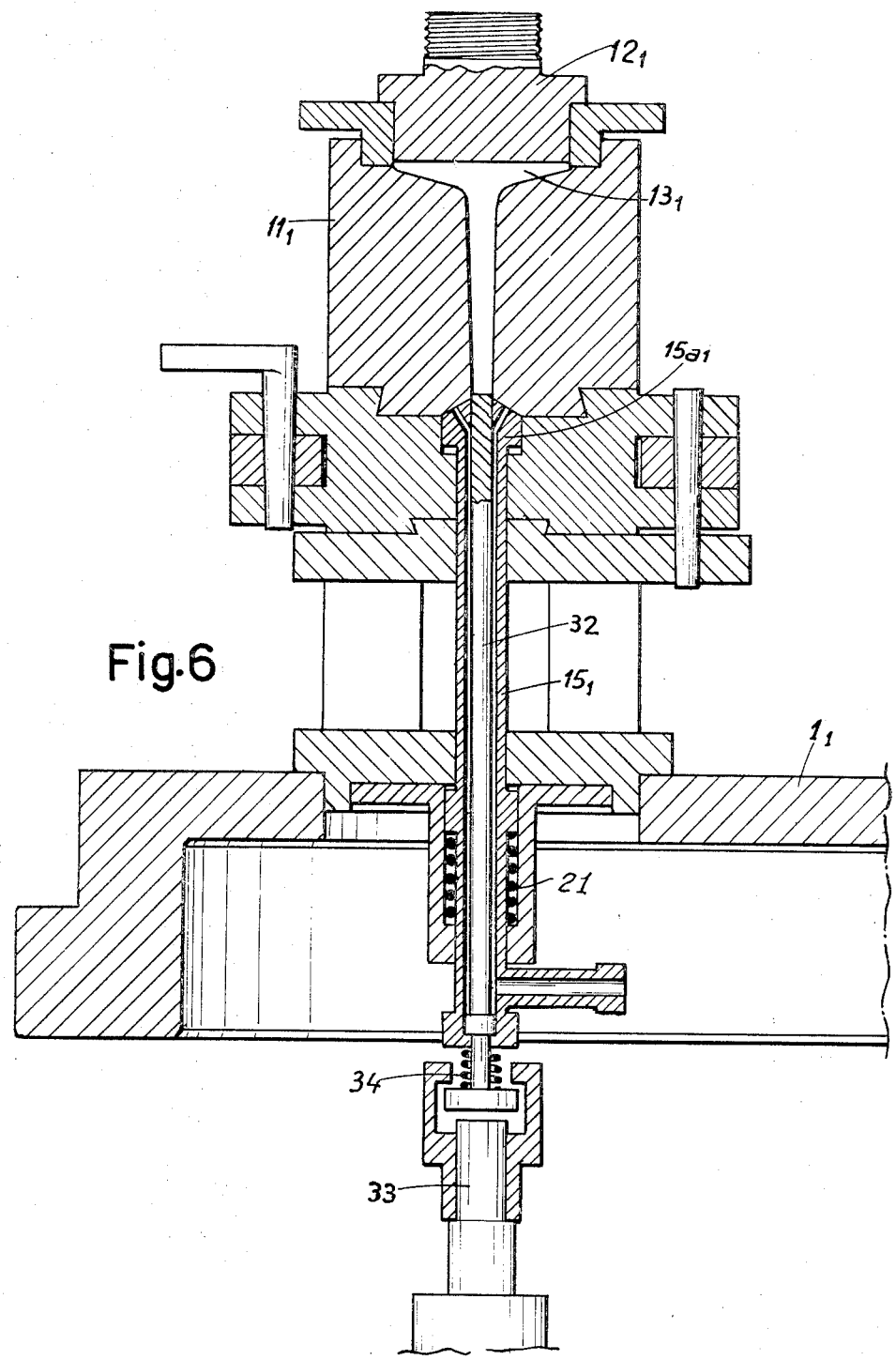

ABSTRACT OF THE DISCLOSURE

A process and apparatus for molding glass in which a single plastic mass of molten glass is introduced into a die at one end thereof and is subjected to a maximum suction force which is developed in the die from a point remote from said one end to accelerate introduction and preforming of the mass within the die. A displaceable plunger serves to regulate the suction in the die and it is displaceable to a position in which the suction is reduced substantially as the plastic mass approaches the region of the displaceable plunger. Thereafter the mass is compressed in the die, preferably in alternation by a compressor member and the plunger. The die is moved step-wise from a filling station where the plastic mass is introduced to a compression station where the mass is compressed in the die. During travel from the filling station to the compression station, the mass is subjected to the reduced suction to insure filling of the cavity and preforming of the mass.

---

The invention relates to a process for the manufacture of moulded articles of glass or like material through production systems, especially automatic ones.

According to this process, a suction is set up in the shaped recess of the die designed to accommodate the plasticized material, said suction facilitating the filling of said recess and being obtained by a suction pressure exerted through passages in correspondence with the zones reached by the material.

The process also provides that a passage to create the suction is maintained with a relatively wide cross-section for a quick suction action and it is decreased in its size before it is reached by the material, so as to avoid that the material itself may penetrate into the smaller suction passage, even if the suction is maintained. According to and advantageous embodiment, the forming of the piece is completed by the effect of two opposite pressure actions, one exerted with a conventional pressing plunger or plug and the other with the movement of the member which produces the variation of the suction passage or passages.

In a multi-station automatic machine, suction is started in the station providing for the introduction of of the material into the die, immediately after the supply of the material, and is maintained during the movement and at least in an additional subsequent station.

In most cases, suction is obtained through an annular port.

The aforesaid process is advantageously obtained in an equipment for the manufacture of moulded objects of glass or like material, including a die—which may be an openable die or block mold—forming the shaped recess and a cavity to accommodate the material designed to form the moulded piece and in which the pressing plunger penetrates. According to the invention, a port having a restricted size to avoid the penetration of the material therein, is opened in the shaped recess spaced from the plunger cavity; said port forms a suction passage connected to a vacuum source which is operated after the introduction of the material into the plunger cavity.

An equipment according to the invention, in a particularly advantageous embodiment includes a member movable with respect to the die and forming a portion of the wall of the die recess, spaced from the plunger cavity; a suction port is formed between the fixed portion and said movable member and said port is connected to a vacuum source, the shaping of the movable member and the fixed portion of the die being such whereby the port is restricted in the position which the movable member assumes in the moulding arrangement and is larger when said member is withdrawn from said position.

The movable member may be urged by a spring into the moulding position, while suitable control means for the movable member are provided so that it may reach the moulding station before the material has reached said suction port.

When the delivery of the moulded piece requires the use of an expelling member, such expelling member can be housed in said movable member which is coaxial with respect to the moulding recess.

When the equipment includes a plurality of dies and a movable structure to carry each die into successive working stations, a suction manifold may be provided to connect each die to the vacuum source, when it is in the material loading position and when it reaches at least the subsequent moulding station or until it has reached the moulding position.

The process may be used either with pit type dies—or block molds—or openable dies. The members to set up the process may be easily applied to the conventional automatic presses available on the market. The process allows the manufacture of different types of articles at higher speeds than those attained with the same presses by using the conventional forming methods. In some cases, for example, in the manufacture of pedestals or feet with chalice shank, the operation of transformation of the "glass" into a foot that is the flattening operation, may be eliminated. In the manufacture of articles usually obtained by extrusion with a "glass" is eliminated, the consumption of melted glass is reduced and the auxiliary finishing operations are reduced.

The invention will be better understood from the following description in the specification with reference to the accompanying drawing, which illustrates an embodiment of said invention. In the drawing:

FIG. 2 illustrates a radial section of an openable type die, made according to the invention;

FIGS. 3 and 4 illustrate a detail of FIG. 1 taken along the line III—III of FIG. 2 and in a different position;

FIG. 5 illustrates a detail of FIG. 2 in a different position;

FIG. 6 illustrates a cross-section of the pit type die equipment according to the invention;

Figure 1:
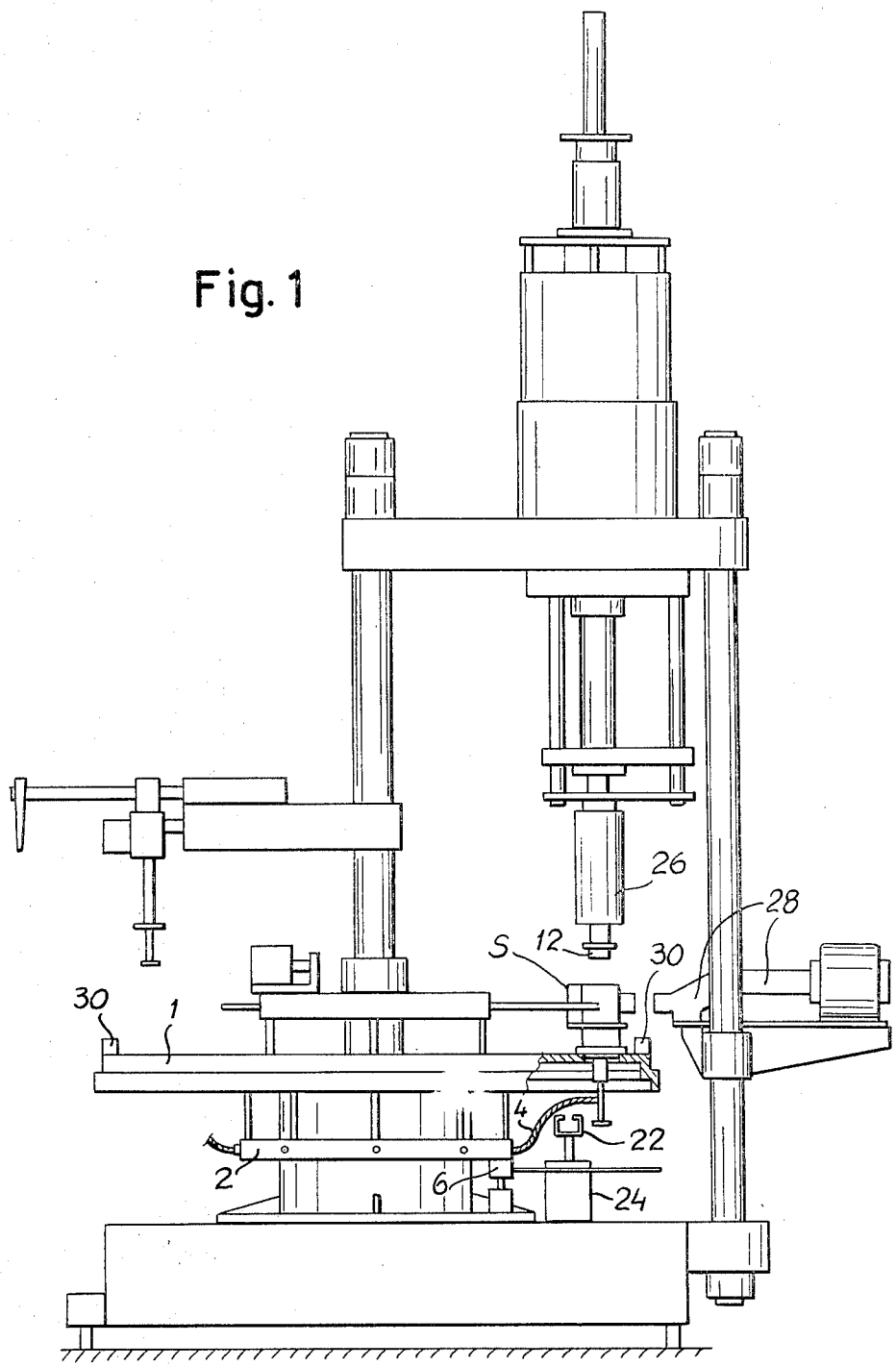
FIG. 1 illustrates a conventional automatic press, provided with the equipment according to the invention.
Figure 7:
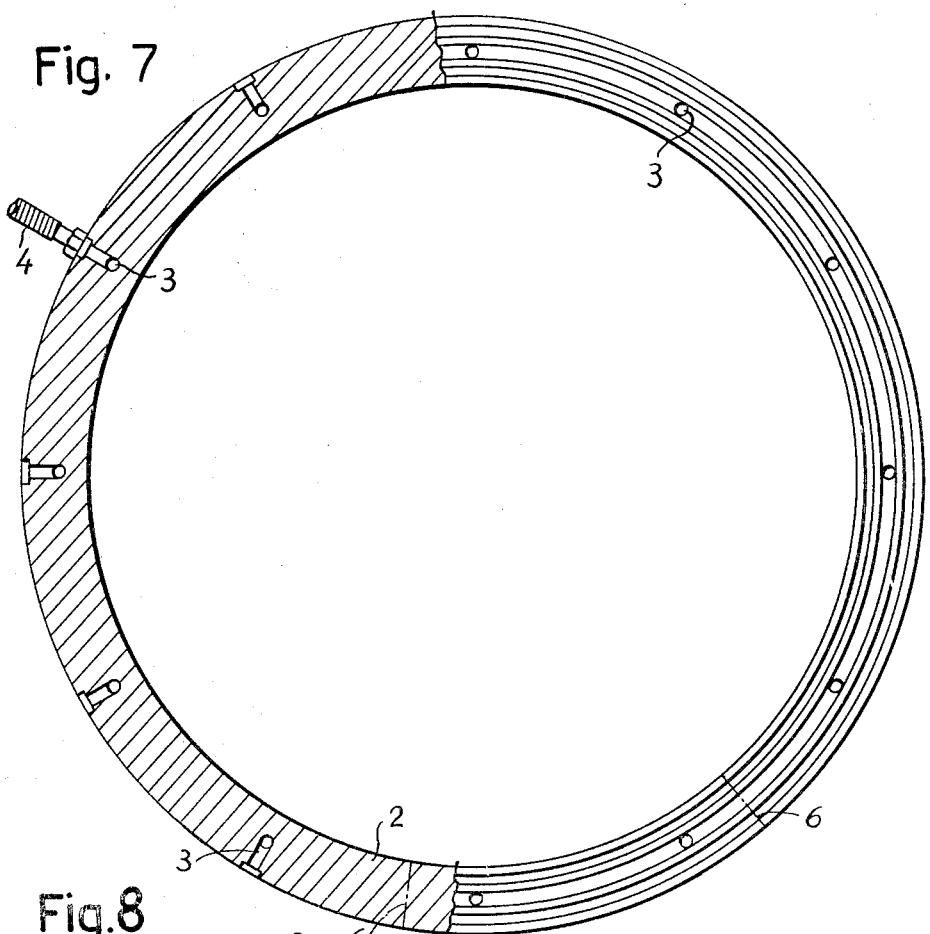
FIGS. 7, 8, 9 and 10 illustrate the members of an air manifold, respectively in a view and in a partial section taken along the line VII—VII of FIG. 8, in a transversal section with the spaced members, in the view taken along the line IX—IX and in the section taken along the line X—X of FIG. 8.
Figure 8:
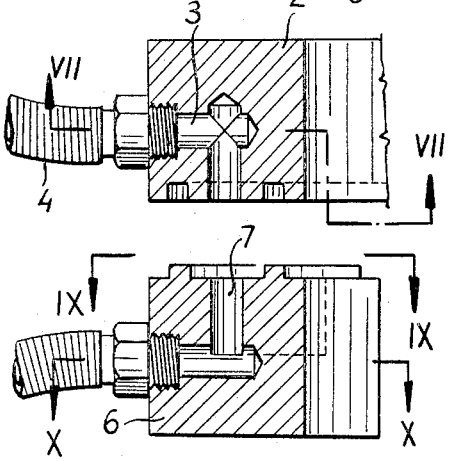
Figure 9:
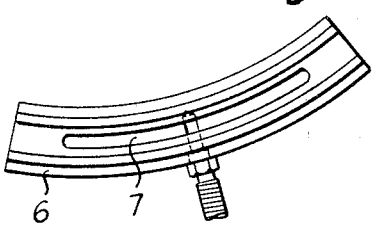
Figure 10:
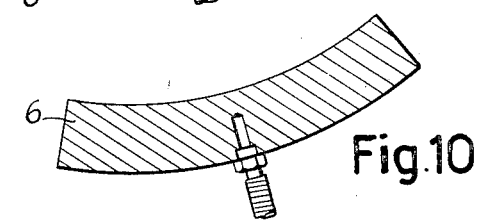

The press according to FIG. 1 is the usual type and is equipped with the devices required to perform the indicated process, and is provided with openable dies designed for the manufacture of feet for chalice shank as shown in FIG. 2.

An annular connecting coupling 2 (also see FIGS. 7 to 10) is rigidly suspended to the rotary plate 1 of the press and is provided with so many sucked air fittings 3 as the dies mounted on the press. Each of these fittings 3 is connected to a die S by means of a flexible hose 4. The annular coupling 2 slides as a seal on a slotted sector 6 resiliently fixed to the press base; therefore the air fitting 3 during the table rotation are located in subsequent pairs, or three or four in a group (according to requirements), in connection with the vacuum grid for a continuous length included between the station in which the fluid glass drop falls into the die and the pressing station. For this purpose, the slotted sector 6 is provided with a slot channel 7, having an appropriate extension. Suitable channels and shoulders assure the seal. The slotted sector is replaceable in order to have the slot of the desired development.

In FIG. 2 there is shown an openable die for the manufacture of a shank with the chalice foot therein, 11 denoting the die, 12 the pressing plunger entering into the cavity 13, made up as a "glass," and 14 denoting the base of the die, which is passed through by a vertically movable member 15 forming the final portion of the recess 16 of the piece.

Once fallen the drop of fluid glass into the cavity 13 of the die, the recess 16 results closed, whereby, if a depression is set up therein, the fluid glass occupies the voids of said recess. This depression is obtained far from the cavity 13, sucking the air contained in the recess 16 through a circular crown suction passage, made between the die 11 and the member 15, around the head of the bottom 15a thereof, and said passage being connected with the vacuum grid.

Desiring to ataain high production speeds, the duration of the suction effected through a circular crown having a fixed cross-section of a few tenths of a millimeter—a value which is not to be exceeded if one desires to avoid burrs in the finished piece—would not be sufficient to obtain the desired result. Therefore, the bottom 15a is made movable to vary, according to the requirements, the cross-section through which suction is exerted. For this purpose. The bottom 15a is housed in a seat having several diameters 11a of the die and may be moved from the moulding position illustrated in FIG. 2 (wherein the dimension of the circular crown of the suction passage has reduced dimensions in order to avoid any burrs) into the position of FIG. 5, in which the suction passage has much larger dimensions.

The bottom 15a is provided with suction holes 18 connected to an annular hole 18a, joined to the flexible hose 4 and thus to the annular rim 2 of connection. The member 15 ends in an extension 15b and is assembled in the interior of a guide 20. The member 15–15a is kept in its usual raised position (FIG. 2) in order to have the closure of the die bottom by an appropriately calibrated spring 21, which urges the member 15 against a positioning stop.

For each movement of the table 1 of the press, a die is located in the loading position and the extension 15b of the corresponding member 15 is fixed into a housing formed by the member 22. which is integrally mounted onto the shaft 23 of the plunger of a compressed air cylinder 24, fixed to the press base.

Upon the falling of the molten glass drop in 13, the bottom 15a is lowered by the cylinder 24, for instance, to the position shown in FIG. 5. The downward motion of the shaft 23 of the cylinder 24 overcomes the resistance of the spring 21 and moves the bottom 15a for the distance required to set up the suction section which, during the allowed time, allows to obtain a sufficient vacuum state in the recess 16 to lower the fluid glass into said recess.

As soon as the latter is substantially completely filled with plastic glass, the bottom head 15a is returned again in its usual position (FIG. 2) by means of the upward motion of the shaft 23 of the cylinder. The raising of the bottom 15a from the position of FIG. 5 to that of FIG. 2 facilitates the filling of the recess 16 with glass.

Prosecuting the rotation of the press table or plate, the die 11 and the entire die assembly S moves, and the extension 15b of the member 15 is released from the member 22 and while the spring 21 keeps the bottom head in the bottom position of closure of the recess 16 (FIG. 2), the suction goes on through the clearance existing between the head of the bottom 15a and the die 11.

When the die 11 is located in the pressing station, the movement of the shaft of the pressing cylinder 26 (FIG. 1) pneumatically effects the descent of the plunger 12 of the die, which effects, by pressure, the completion of the article to be made. The movable member 15 may be advanced in several times, and there may also be provided a final advance to the position of FIG. 2 during the pressing stage, in such a manner that said pressing is effected in two opposite directions and by two opposite members. In any case, the pressing does not produce forced slips of the glass in the die and this allows a better surface of the piece and a longer preservation of the die.

It is apparent that the suction will set up a much more efficient vacuum in the recess 16, the better the seal thereof will be; in order to attain as much as possible this ideal condition, in the case of openable dies, the valves of the mould (such as 11) are locked, even in the position of the falling drop, by means of suitable squeezers such as those denoted by 28 (FIG. 1), which are appropriately synchronized.

As by means of the described process, it is possible to attain very high production speeds, it is not easy to provide for—with subsequent manual controls—the prompt exclusion with the use of openable dies, firstly of the falling of the drop into the mould and then the action of the two squeezers and the pressing plunger, relocating the whole in an operative position upon the passage of the following mould. Therefore there is provided a system, which, once actuated with a single manual control, will effect in a complete automatic and perfect sequential manner, all the above stated operations. For this purpose, on the outside of the press rotary table or plate and in correspondence of the moulds radial axes, movable control members 30 are located and are easily operable by hand in any position of the table to assume an inactive position (FIG. 4) in the regular operational conditions, and a control position in the event of a detected irregularity by the operator; in the latter position, upon the passage of the mould, whose corresponding member 30 has been operated, the trough of the feeder is arranged in the discharge position, and the cylinder plungers of the closing squeezers are locked in a rest position and the controls of the pressing plunger cylinders and of motion for the member 15 are neutralized.

As it is clearly shown in FIG. 6, the described process is also usable with pit-type dies; in said figure, the members corresponding to those of the die 1 of FIG. 2 are indicated with the same references and with an index "1." The mould $11_1$ is not made of two pieces, but of one piece; the bottom 15a is slightly different from that of the preceding embodiment, but is operationally similar. The detachment of the article from the die is obtained in this case with the motion of a movable extractor 32, resiliently incorporated in the member $15_1$. When the mould $11_1$ arrives at the discharge station, the extractor 32 is urged upwardly by one of the conventional pushers, such as that denoted by 33, of which the automatic presses, available on the market, are provided with. A spring 34, reacting on the member $15_1$, usually keeps the extractor lowered; once finished the action of the pusher 33, the extractor 32, stressed by the spring 34, returns into its usual position.

It is intended that the drawing only illustrates an embodiment given only as a practical demonstration of the invention, said invention being in conditions as to be varied in the forms and arrangements without however departing from the scope of the concept which informs said invention,

What I claim is:

1. A process for moulding molten glass in a mold, said process comprising introducing a single plastic mass of molten glass into a die at one end thereof, applying maximum suction in said die from a point remote from said one end to accelerate introduction and pre-forming of the mass within the die, reducing the suction substantially as the plastic mass approaches the region where the suction is applied, and thereafter compressing said mass in said die while the reduced suction is applied to the mass.

2. A process as claimed in claim 1 comprising moving the die from a filling station where plastic mass is introduced therein to a compression station where the mass is compressed in said die, said mass being subjected to the reduced suction as the die is moved from said filling station to the compression station.

3. A process as claimed in claim 2 wherein said mass at said compression station is subjected to compression at opposite ends thereof.

4. Apparatus for moulding molten glass comprising a step-wise rotating table, a plurality of injection dies carried by said table, a filling station and a compression station to which each die is sequentially brought during rotation of the table, each injection die having a cavity for shaping a plastic mass of glass into a desired form, said die having a first upper opening for the introduction of a mass of plastic glass, and a second opening opposite said first opening at a remote location in said die, suction generating means connected to said second opening for producing a suction force in said cavity and including a manifold to generate suction during the transfer from the filling station to the compression station, a displaceable plunger means in said die having a first position within said second opening to partially block the same and hence reduce the degree of suction produced in said cavity, said plunger means being displaceable to a second position away from said second opening to leave the same completely open whereby maximum suction is produced in said cavity and thereby the glass mass therein is forcibly displaced into said cavity and pre-formed therein, said plunger means remaining in said first position as said die is advanced from the filling station to the compression station whereby the glass mass is continuously subjected to the limited degree of suction, and compression means at said compression station to exert compression on the mass while the plunger means remains in said first position and applies counterpressure on the glass mass.

5. Apparatus as claimed in claim 4 comprising spring means acting on said displaceable plunger to urge the same to said first position, and control means acting on said displaceable plunger to move the same to said second position against the action of said spring means, said control means releasing the displaceable plunger for return to said first position under the action of said spring means before the glass mass reaches said second opening.

6. Apparatus as claimed in claim 4 wherein said displaceable plunger is coaxial with said second opening and includes an axially displaceable expeller therein.

References Cited

UNITED STATES PATENTS

| | | | |
|---|---|---|---|
| 1,982,103 | 11/1934 | Hiller | 65—76 |
| 2,417,328 | 3/1947 | Sloan | 65—76 |
| 3,171,729 | 3/1965 | Anderson | 65—76 |

ARTHUR D. KELLOGG, Primary Examiner

U.S. Cl. X.R.

65—209, 250, 308